United States Patent [19]

Snavely, Jr.

[11] 3,724,552

[45] Apr. 3, 1973

[54] WELL TREATING METHOD TO REMOVE PARAFFIN DEPOSITION

[75] Inventor: Earl S. Snavely, Jr., Arlington, Tex.

[73] Assignee: Mobil Oil Corporation, New York, N.Y.

[22] Filed: Nov. 1, 1971

[21] Appl. No.: 194,122

[52] U.S. Cl. ..........166/304, 166/305 R, 252/8.55 B, 166/307
[51] Int. Cl. ......................E21b 21/00, E21b 43/25
[58] Field of Search..166/304, 305 R, 307, 274, 273; 252/8.55 B, 8.55 D, 8.3; 137/15

[56] References Cited

UNITED STATES PATENTS

| | | |
|---|---|---|
| 1,844,883 | 2/1932 | DeGroote..........................166/304 X |
| 2,059,459 | 11/1936 | Hund et al..........................166/304 X |
| 2,358,665 | 9/1944 | Shapiro..........................166/304 UX |
| 2,602,778 | 7/1952 | Snyder et al......................166/304 X |
| 3,139,439 | 6/1964 | Kettering.........................252/8.55 D |
| 3,241,614 | 3/1966 | Bertness..............................166/304 |
| 3,375,192 | 3/1968 | Rowlinson........................166/304 X |
| 3,402,770 | 9/1968 | Messenger.......................166/305 R |
| 3,563,315 | 2/1971 | Claytor, Jr. et al...................166/304 |

*Primary Examiner*—Stephen J. Novosad
*Attorney*—William J. Scherback et al.

[57] ABSTRACT

This specification discloses a method of treating a well having an oil column therein and penetrating an oil-containing subterranean formation to dissolve paraffin deposits from the well and the formation. There is injected into an upper end of the well an aqueous solution of a water-soluble compound that has a greater specific gravity than the oil in the well, which water-soluble compound decomposes into carbon disulfide under conditions existing in a lower portion of the well. The aqueous solution of the water-soluble compound settles downwardly through the oil in the well to the lower portion thereof where it decomposes thereby releasing carbon disulfide which then dissolves paraffins from the well and formations communicating therewith. Water-soluble compounds suitable for use in accordance with the method of this invention are selected from the class consisting of trithiocarbonates, dithiocarbamates, and xanthates.

10 Claims, No Drawings

WELL TREATING METHOD TO REMOVE PARAFFIN DEPOSITION

BACKGROUND OF THE INVENTION

This invention relates to the treatment of a well and a subterranean petroleum-containing formation penetrated by the well. More particularly, this invention relates to the treatment of a well or subsurface formations to remove therefrom or prevent the forming therein of petroleum waxes, often referred to as "paraffin deposits".

In the production of certain types of petroleum or oil from subterranean formations penetrated by a well, paraffins are deposited from the oil and tend to clog the pores of the reservoir rock, well casing, perforations, screens, and tubing through which the oil flows to the surface. Various techniques have been employed in the removal of these paraffin deposits from subterranean formations and wells penetrating such formations. These techniques include the use of mechanical and heating devices, explosives, and solvents. Various types of solvents which have been used to dissolve the paraffins include benzene, xylene, toluene, gasoline and heavier distillates, carbon tetrachloride and carbon disulfide. The solvents have been run into wells through tubing, through the annulus formed between the well casing and tubing, and poured into the open casing. Solvents have also been lowered into wells in dump bailers.

One of the most effective solvents for paraffins of widely different compositions is carbon disulfide. Use of carbon disulfide is difficult and hazardous, however, especially in critical areas such as offshore platforms and near oil and gas storage areas. Carbon disulfide is extremely toxic and inflammable, having a flash point of −22° F, and an ignition temperature in air of 257° F. Further, carbon disulfide is very volatile, having a boiling point of 115.3° F. In addition, carbon disulfide is highly soluble in oil, thus making if difficult to place in concentrated form at a lower portion of a well having oil therein where it normally needs to be placed in order to dissolve the most troublesome paraffin deposits.

In U.S. Pat. No. 3,241,614 to Bertness, there is described a process of removing hydrocarbon accumulations from within a wellbore wherein the hydrocarbon accumulations are contacted with a liquid mixture comprising a solvent for hydrocarbons and a surfactant. Various hydrocarbon solvents are mentioned that may be employed in this mixture. Among those mentioned is carbon disulfide. In U. S. Pat. No. 3,375,192 to Rowlinson, there is described a mixture for use in cleaning oil wells. This mixture is made up of 84–92 percent by volume of carbon disulfide and 8–16 percent by volume of pentane. The pentane is added to the carbon disulfide to raise the ignition temperature of the carbon disulfide thereby reduce the fire hazard of the same. In U. S. Pat. No. 3,402,770 to Messenger, there is disclosed a single-phase solvent which may be employed to dissolve flow-restricting materials from a well or from a subterranean formation. This solvent is comprised of a solution containing an organic solvent for oil and asphalt and a liquid having mutual solubility for oil and water. Carbon disulfide is cited as a preferred organic solvent for oil and asphalt. In U. S. Pat. No. 2,358,665 to Shapiro, there is described a method of removing wax deposits from oil well tubing by use of a solvent emulsion which is adapted to break and release the solvent within a definite and narrow temperature range and which may therefore be placed at the particular depth at which it is needed. The emulsions disclosed are immiscible with petroleum and by reason of their greater specific gravity sink through the oil column without change until they reach the temperature level at which they are adapted to break. On reaching this temperature level, the emulsions break and release the solvent in undiluted condition and the wax is thereby dissolved and caused to pass out of the tubing. The emulsions consist essentially of a wax-bitumen solvent (which must be heavier than and insoluble in water), a petroleum distillate such as the well-known rubber solvent, and a small quantity of water. Carbon tetrachloride and carbon disulfide are mentioned above as examples of solvents for a mixture of wax and bitumen. These substances may be used singly or in admixture and may be wholly or in part substituted by other wax solvents such as chlorinated hydrocarbons.

SUMMARY OF THE INVENTION

This invention is directed to a method of treating a well that penetrates a subterranean formation and has an oil column therein and paraffin deposits at a lower location thereof. There is injected into the well at an upper extremity thereof an aqueous solution of a water-soluble compound that will decompose into carbon disulfide at the conditions of temperature and acidity existing at the lower location. The aqueous solution has a greater specific gravity than the oil and thus settles downwardly through the oil column to the lower location. In accordance with an embodiment, the water-soluble compound is selected from the group consisting of trithiocarbonates, dithiocarbamates, and xanthates.

In accordance with still another embodiment, there is provided a method of treating a well penetrating a subterranean formation wherein there is injected into the well an aqueous solution of a water-soluble compound selected from the group consisting of trithiocarbonates, dithiocarbamates, and xanthates. Subsequently, the aqueous solution is contacted at the lower location with acid whereby the water-soluble compound is decomposed into carbon disulfide.

DESCRIPTION OF THE PREFERRED EMBODIMENTS

This invention relates to treating a well that extends into the earth and that penetrates a subterranean oil-containing formation. More particularly this invention relates to dissolving paraffin deposits in the well and formation.

I have discovered that paraffin deposits may be removed from a well and an oil-containing formation penetrated thereby by injecting into the well an aqueous solution of a water-soluble compound which decomposes into carbon disulfide under conditions existing in the well, namely, an acid environment and high temperatures. The acidic environment may be provided by acidic gases such as carbon dioxide and hydrogen sulfide which are normally present in and produced from oil-containing formations. The high temperatures may be provided by those naturally existing in wells due to the temperature gradient of the earth.

Classes of water-soluble compounds which decompose under conditions existing in wells and which I have found satisfactory for use in accordance with this invention are trithiocarbonates, dithiocarbamates, and xanthates. These compounds are particularly suited for use in treating wells because they are water soluble and decompose to release carbon disulfide in the range of conditions that are encountered in oil wells. Compounds within these classes which I have found to be particularly suited for this use include sodium trithiocarbonate, disodium ethylenebisdithiocarbamate, and sodium ethyl xanthate. Such compounds have been used for other purposes and their properties and method of preparing them are well known. Dithiocarbamates, for example, have been used as fungicides and xanthates are produced in major amounts for the manufacture of rayon. A method for preparation of trithiocarbonates is found in "Formation of Sulfides During a Reaction of Carbon Disulfide with Bases", E. B. Veideman and A. I. Meas, Khim Volokna 1965(2) 34–36. A method for the preparation of dithiocarbamate is found in "Thermochemistry and Kinetics of Ammonium Dithiocarbamate Hydrolysis", E. L. Fuller, Ph. D. dissertation, University of Nebraska, 1963, University Microfilms, Ann Arbor, Mich.

A compound which I have found to be particularly well suited for use in treating wells and one that is therefore preferred is disodium ethylenebisdithiocarbamate. This compound was prepared in the acid form in the laboratory for testing by reacting an aqueous solution of ethylene diamine with carbon disulfide at 40°C. The carbon disulfide was added dropwise to 250 milliliters of a mixture of 125 cubic centimeters of ethylene diamine and water maintained at 40°C. while stirring. An orange solution formed and crystals of yellow compounds were precipitated after 75 cc's of carbon disulfide were absorbed. The sodium salt of the reaction products was formed by adding concentrated sodium hydroxide. The resulting solution was found to be stable at 180°F. on heating in an ampoule but decomposed producing free carbon disulfide when hydrochloric acid was added.

The appropriate reactions are as follows:

Preparation

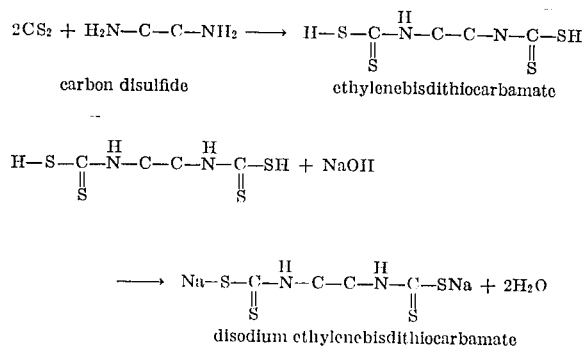

carbon disulfide     ethylenebisdithiocarbamate disodium ethylenebisdithiocarbamate Decomposition

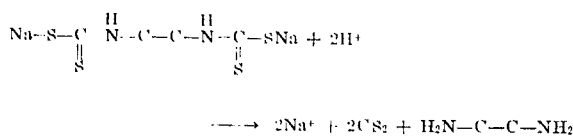

Other dithiocarbamates which are particularly preferred in carrying out this invention are those which decompose into carbon disulfide and organic corrosion-inhibiting amines. Upon decomposition in a well or formation the carbon disulfide is present for dissolving paraffins and the corrosion-inhibiting amines are present for protecting the metal well casing and associated equipment from corrosion. An example of a dithiocarbamate which decomposes under conditions existing in a well into carbon disulfide and an organic corrosion-inhibiting amine is disodium hexadecamethylenebisdithiocarbamate. This is formed by reacting carbon disulfide with hexadecamethylenediamine and the appropriate reaction is as follows:

Preparation $$CS_2 + H_2N-(CH_2)_{16}NH_2 + 2NaOH$$

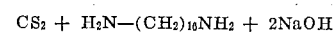

carbon disulfide     hexadecamethylenediamine

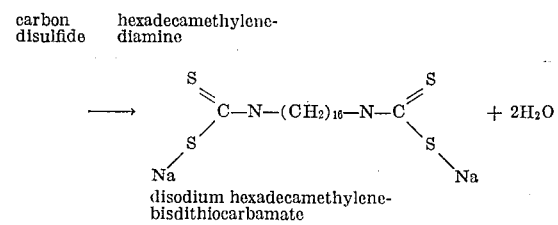

disodium hexadecamethylenebisdithiocarbamate

Any nitrogen containing corrosion-inhibiting compound which forms dithiocarbamates may be reacted with carbon disulfide in accordance with the above reaction to form preferred dithiocarbamates for use in treating wells. Examples of suitable nitrogen containing organic corrosion-inhibiting compounds which may be so employed are urea, guanidine, and cocoa amine.

In accordance with this invention, the well to be treated is normally shut in leaving within the well a column of oil. There is then injected into the well an aqueous solution of a water-soluble compound which will decompose under conditions existing at a lower location of the well and release carbon disulfide. In a preferred embodiment, the water-soluble compound is selected from the group consisting of trithiocarbonates, dithiocarbamates, and xanthates. Aqueous solutions of such compounds have a greater specific gravity than that of the oil forming the oil column and are immiscible with the oil. They may thus be injected into the upper extremity of the well, e.g., into the tubing or casing, and will settle downwardly through the oil column without being diluted by the oil to a lower location of the well where conditions are such that they decompose and release carbon disulfide which is then available in undiluted form for dissolving paraffins either in the well or in the oil-containing formation penetrated by the well.

In accordance with another embodiment, the aqueous solution of the water-soluble compound is injected via the well into a subterranean oil-containing formation penetrated thereby and thereafter oil is produced therefrom. Acid gases such as carbon dioxide and hydrogen sulfide are also produced from the formation, thereby providing an acidic environment which along with the temperatures of the formation bring about a decomposition of the water-soluble compound into carbon disulfide. This decomposition may take place over a period of hours or days, thus providing a continuing treatment of the formation and well.

In some applications it may be desirable to decompose the water-soluble compound more rapidly to provide treatment by a greater amount of carbon disulfide for a shorter period of time. Such applications may be directed to treating a well to remove paraffin deposits from a lower location thereof or from a formation penetrated by the well. For such applications the aqueous solution of the water-soluble compound may be contacted at the lower location of the well or within the formation as desired with acid, thereby causing rapid decomposition of the compound into carbon disulfide. The acid having a greater specific gravity than the oil may be injected into the well at an upper extremity and will settle downwardly through the oil column to the lower location and then mix with the aqueous solution and decompose the water-soluble compound into carbon disulfide. Reactions of such water-soluble compounds as trithiocarbonates, dithiocarbamates, and xanthates with acids to form carbon disulfide are well known. Any acid may be employed in these reactions. Acids which are available and commonly employed in oil field practices and which may be employed in carrying out this invention include hydrochloric acid, hydrofluoric acid, sulfuric acid, and acetic acid. Of these, acetic acid is particularly suited for this use and is preferred because of its availability and price.

The aqueous solution of water-soluble compounds which decompose to release free carbon disulfide may include therein other materials such as surfactants and weighting materials added for special purposes in treating the wells and formation. Such materials may be added for example to adjust the specific gravity of the aqueous solution to provide a satisfactory rate of sink of the aqueous solution through the oil column in the well.

Specific formulations of water-soluble compounds which decompose at specified temperature levels in acidic environments may readily be obtained by varying the concentration of the aqueous mixture of water-soluble compound and also by mixing together two or more water-soluble compounds which decompose at different temperature levels. Thus, formulations may readily be provided for use in specific wells, which formulations will decompose at specified temperature levels. This enables free carbon disulfide to be released at the exact locations desired for maximum effectiveness in dissolving paraffin deposits in wells and subterranean formations.

The amount of water-soluble compounds to be employed in treating a well may readily be determined based upon the amount of paraffin to be dissolved in the well or formation and the amount of free carbon disulfide which will be formed upon decomposition of the water-soluble compound.

I claim:

1. A method of treating a well penetrating a subterranean formation and having an oil column therein and paraffin deposits at a lower location thereof, comprising:

injecting into said well at an upper extremity thereof an aqueous solution of a water-soluble compound that will decompose into carbon disulfide at the conditions of temperature and acidity existing at said lower location, said compound having a greater specific gravity than said oil whereby said compound settles downwardly through said oil to said lower location.

2. The method of claim 1 wherein said water-soluble compound is selected from the group consisting of trithiocarbonates, dithiocarbamates, and xanthates.

3. The method of claim 2 wherein said water-soluble compound is disodium ethylenebisdithiocarbamate.

4. The method of claim 2 wherein said water-soluble compound is a dithiocarbamate formed by reacting a corrosion-inhibiting amine with carbon disulfide.

5. The method of claim 4 wherein said dithiocarbamate is disodium hexadecamethylenebisdiocarbamate.

6. The method of claim 1 wherein said water-soluble compound is injected into said well and into said formation where it decomposes and releases carbon disulfide.

7. A method of treating a well penetrating a subterranean formation and having an oil column therein and paraffin deposits at a lower location thereof, comprising:

injecting into said well at an upper extremity thereof an aqueous solution of a water-soluble compound selected from the group consisting of trithiocarbonates, dithiocarbamates, and xanthates, said aqueous solution having a greater specific gravity than said oil whereby said solution settles downwardly through said oil column to said lower location; and contacting said aqueous solution at said lower location with acid whereby said water-soluble compound is decomposed into carbon disulfide.

8. The method of claim 7 wherein said acid is injected into said well at an upper extremity thereof, said acid having a greater specific gravity than said oil whereby said acid settles downwardly through said oil column to said lower location.

9. The method of claim 7 wherein said acid is acetic acid.

10. The method of claim 8 wherein said water-soluble compound and said acid are injected via said well into said formation.

* * * * *